Figure 1:
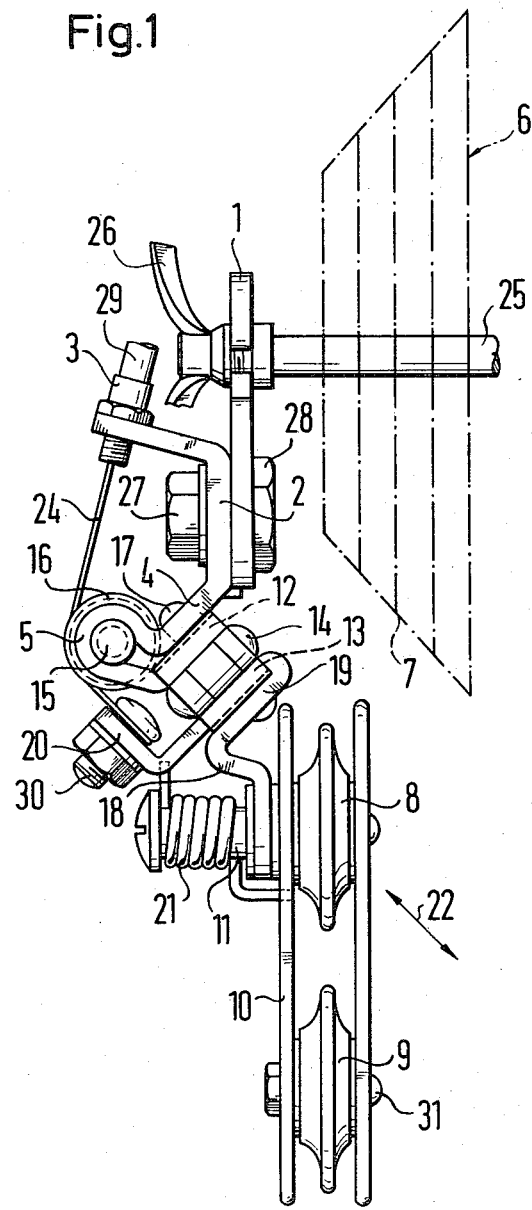

United States Patent [19]
Bergles

[11] 3,847,028
[45] Nov. 12, 1974

[54] LEAF SPRING BIASED DERAILLEUR ARRANGEMENT

[75] Inventor: Eduard Bergles, Graz, Austria

[73] Assignee: Fichtel & Sachs AG, Schweinfurt, Germany

[22] Filed: Feb. 20, 1974

[21] Appl. No.: 444,094

[30] Foreign Application Priority Data
Mar. 23, 1973  Germany............................ 2314555

[52] U.S. Cl.......................... 74/217 B, 74/242.17 B
[51] Int. Cl....................... F16h 11/00, F16h 11/08
[58] Field of Search............. 74/242.15 B, 242.14 B, 74/242.11 B, 242.3, 217 B

[56] References Cited
UNITED STATES PATENTS
2,187,368  1/1940  Todrys .............................. 74/217 B FOREIGN PATENTS OR APPLICATIONS
597,097  3/1945  Great Britain .................... 74/217 B
473,092  7/1952  Italy ................................. 74/217 B

*Primary Examiner*—Samuel Scott
*Assistant Examiner*—Allan R. Burke
*Attorney, Agent, or Firm*—Hans Berman

[57] ABSTRACT

The cage carrying the guide wheel and the tensioning wheel of a derailleur arrangement in a bicycle is attached to the rear wheel shaft by an elliptic spring assembly whose two leaf springs have longitudinally terminal portions hingedly fastened to each other for pivotal movement about pivot axes perpendicular to the generatrix of the conical enveloping surface defined by the stack of drive sprockets on the rear wheel shaft. The center portion of one leaf spring is fastened to the rear wheel shaft, and the center portion of the other leaf spring is fastened to the shaft of the guide sprocket on which the cage pivots.

8 Claims, 2 Drawing Figures

3,847,028

LEAF SPRING BIASED DERAILLEUR ARRANGEMENT

This invention relates to variable speed transmissions for bicycles, and particularly to an improved derailleur arrangement for the rear wheel of a bicycle carrying a stack of sprocket wheels of different diameter for alternative driving engagement by a pedal-operated chain.

It is common practice to provide a bicycle of the type described with a guide wheel for the chain, and with a mechanism for shifting the guide wheel in the common direction of its axis of rotation and of the rear wheel axis to shift the chain between the several sprockets on the rear wheel shaft, whereby the transmission ratio between the pedals and the rear wheel is changed. A simple mechanism for shifting the guide wheel while keeping its axis of rotation parallel to that of the rear wheel essentially consists of a parallelogram linkage which may be shifted as needed by the rider of the bicycle. It is a disadvantage of this arrangement that it is relatively fragile and readily damaged in a spill. Other mechanisms proposed heretofore, which are better protected against mechanical damage, are relatively complex and correspondingly costly.

It is an important object of the present invention to provide a variable-speed transmission arrangement of the afore-described type with a chain shifting mechanism sturdy enough to resist mechanical damage better than a parallelogram linkage, yet simple and capable of being built at less cost.

With this object and others in view, as will presently become apparent, the invention, in one of its more specific aspects, resides in a variable-speed transmission arrangement in which a plurality of sprocket wheels are mounted on a shaft for rotation about the axis of the latter. The wheels decrease in diameter in axial sequence and jointly define a conical enveloping surface whose generatrix is obliquely inclined relation to the shaft axis.

Two elongated leaf springs and two hinges connecting respective first longitudinal end portions of the two leaf springs and respective second longitudinal end portions of the two leaf springs jointly constitute an elliptic spring assembly in which the two leaf springs can move relative to each other about the two pivot axes of the hinges. The two pivot axes, which are spaced in the direction of elongation of both leaf springs, jointly define a plane perpendicular to the afore-mentioned generatrix in all operative positions of the transmission arrangement. Intermediate portions of the leaf springs are spaced from that plane in opposite directions.

A carrier fixedly secures an intermediate portion of one leaf spring to the shaft of the drive sprockets, and a manually operable device is provided for moving the intermediate portions of both leaf springs toward and away from each other. A bracket is fastened to the intermediate portion of the other leaf spring and supports the guide wheel for the chain so that the guide wheel may rotate about an axis extending in the direction of the axis of the shaft carrying the drive sprockets.

Figure 2:
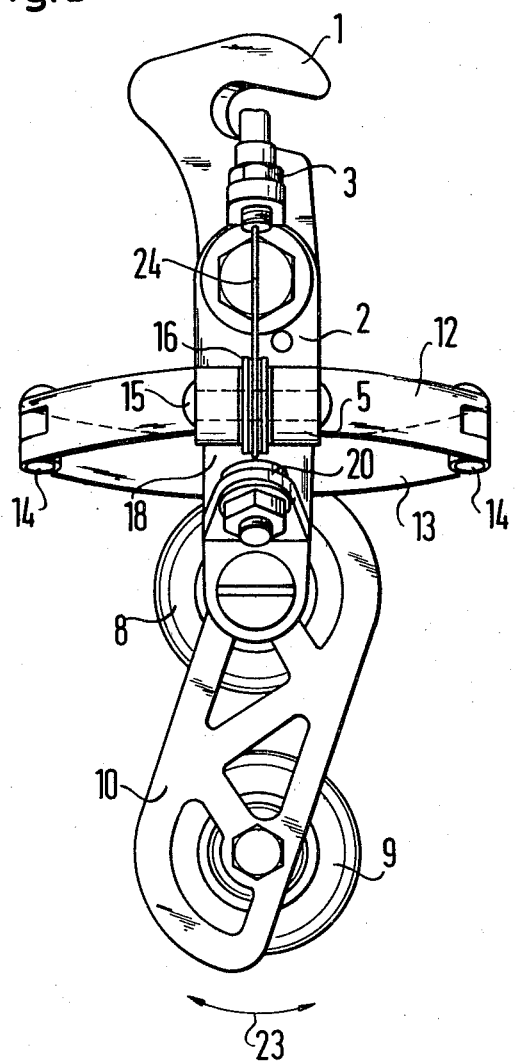

Other features, additional objects, and many of the attendant advantages of this invention will readily be appreciated as the same becomes better understood by reference to the following detailed description when considered in connection with the appended drawing in which:

FIG. 1 shows elements of a bicycle equipped with a chain shifting device of the invention in front elevation and partly in a conventional manner; and FIG. 2 illustrates the chain shifting device of FIG. 1 in side elevation.

Referring now to the drawing in detail, and initially to FIG. 1, there is shown only as much of an otherwise conventional bicycle as is needed for an understanding of this invention. The shaft 25 of the rear wheel, not otherwise shown, is normally fixedly fastened in the bicycle frame, not shown. It carries a stack of drive sprockets 6 whose diameters decrease in axial sequence from the right toward the left, as viewed in FIG. 1, the sprockets being conventionally represented by the enveloping conical surface whose generatrix 7 is obliquely inclined relative to the common axis of the shaft 25 and the sprockets 6.

The chain-shifting mechanism, with which this invention is more specifically concerned, is fixedly fastened to the shaft 25 by means of a hook-shaped lug 1 receiving an end of the shaft 25, a wing nut 26, and other conventional elements, not shown. An elongated carrier 2 of flat bar stock is adjustable attached to the lug 1 by means of a bolt 27 and nut 28. The two longitudinal end portions of the carrier bar 2 on either side of the bolt 27 diverge in a direction away from the sprockets 6, and an attachment 3 for the sleeve 29 of a Bowden cable is mounted on the free end of the shorter end portion.

The longer end portion 4 is folded over on itself in a loop 5 about a short shaft 15 for an idler pulley 16 over which the wire 24 of the afore-mentioned Bowden cable is trained. The free end of the carrier bar 2 and the part of the carrier bar on which the free end is folded are parallel and perpendicular to the generatrix 7. A leaf spring 12 is clamped between the two folded-over parts of the carrier bar 2 and further secured by a rivet 17. The leaf spring 12, is elongated, as is better seen in FIG. 2, and may be flattened against its resilient resistance.

The two longitudinally terminal portions of the spring 12 are pivotally connected to corresponding portions of an identical leaf spring 13 by hinge pins 14, so that the two leaf springs and the connecting hinge pins jointly form an elliptic spring assembly. The intermediate portion of the spring 12 clamped between the folded-over parts of the carrier bar 2 is equidistant from the pivot axes of the hinge pins 14 which jointly define a plane perpendicular to that of FIG. 1 and perpendicular to the generatrix 7.

The central portion of the leaf spring 13 intermediate the hinge pins 14 is clamped and riveted between folded-over, longitudinally central parts 19 of a bracket 18 of flat bar stock. One end 20 of the bracket bar 18 is offset at right angles from the longitudinally adjacent portion of the bar 18 into a plane spacedly parallel to the generatrix 7, as viewed in FIG. 1, and the free end of the Bowden wire 24 is attached to the end 20 by a bolt 30. The wire 24 is parallel to the bracket end 20 from the bolt 30 to the idler pulley 16.

The other end of the bracket bar 18 is perpendicular to the shaft 25 and carries a shaft 11 whose axis is parallel to that of the shaft 25. A guide wheel 8 rotates about the axis of the shaft 11 between two flat, perforated plates of an elongated cage 10 whose one end is pivoted on the shaft 11, and whose other end is assembled by means of a shaft 31 on which a tensioning wheel 9 is mounted for rotation in a common plane with the guide wheel 8. The cage 10 thus may swing on the shaft 11 as indicated by the arrow 23 in FIG. 2, and is biased to pivot in one direction by a helical torsion spring 21 coiled about the shaft 11. The ends of the spring 21 abut against the bracket bar 18 adjacent the bolt 30 and against a narrow edge of one plate of the cage 10.

In the position shown in FIG. 1, the springs 12, 13 are almost flattened by the tension of the wire 24 and the compressive forces in the sleeve 29 of the Bowden cable whose non-illustrated end is attached to an operating lever on the handle bars or on the horizontal top member of the bicycle frame, as is conventional and not shown. The wheels 8 and 9 are located in a common plane of rotation with the smallest sprocket 6. When the Bowden cable is relaxed, the springs 12, 13 shift the cage 10 in the direction of the arrow 22 in FIG. 1 parallel to the generatrix 7 so that the common plane of rotation of the wheels 8, 9 sequentially coincides with those of the other sprockets 6. The moving drive chain, omitted from the drawing and normally trained over the wheels 8, 9 and one of the sprockets 6, is shifted between the sprockets 6 as the wheel 8 is moved by the Bowden cable in the direction of the arrow 22. The wheel 9, biased by the spring 21, prevents slack in the chain during shifting from a larger to a smaller sprocket 6.

The leaf springs 12, 13 provide precise rectilinear guidance for the wheel 8 in such a manner that the shaft 21 is always parallel to the shaft 25 and the length of chain between the wheel 8 and each of the sprockets 6 remains practically constant.

The chain-shifting arrangement of the invention consists of very few parts readily formed from inexpensive standard steel stock. The leaf springs 12, 13 are sturdy enough not to suffer damage or distortion in a spill, and the other elements of the chain-shifting device are even less sensitive.

It should be understood, of course, that the foregoing disclosure relates only to a preferred embodiment, and that it is intended to cover all changes and modifications of the example of the invention herein chosen for the purpose of the disclosure that do not depart from the spirit and scope of the invention set forth in the appended claims.

What is claimed is:

1. A variable-speed transmission arrangement comprising, in combination:
   a. a shaft having an axis;
   b. a plurality of sprocket wheels mounted on said shaft for rotation about said axis;
      1 said wheels decreasing in diameter in axial sequence and jointly defining a conical enveloping surface having a generatrix obliquely inclined relative to said axis;
   c. elliptic spring means including two elongated leaf springs having each a first and a second terminal portion, and two hinge means respectively connecting said first terminal portions and said second terminal portions for relative pivotal movement of the connected terminal portions about a first pivot axis and a second pivot axis,
      1. said pivot axes being spaced from each other in the direction of elongation of said leaf springs and jointly defining a plane perpendicular to said generatrix,
      2. said leaf springs having respective longitudinally intermediate portions spaced from said plane in opposite directions;
   d. carrier means fixedly securing one of said intermediate portions to said shaft;
   e. manually operable moving means for moving said intermediate portions toward and away from each other;
   f. a guide wheel; and
   g. bracket means fastened to the other intermediate portion and supporting said guide wheel for rotation about an axis extending in the direction of the axis of said shaft.

2. An arrangement as set forth in claim 1, wherein each of said intermediate portions is equidistant from said first pivot axis and of said second pivot axis, and the axes of rotation of said sprocket wheels and of said guide wheel are parallel.

3. An arrangement as set forth in claim 2, wherein said carrier means include an elongated carrier bar and said bracket means include an elongated bracket bar, one of said bars having a longitudinal portion folded back on itself and clampingly receiving one of said intermediate portions between the folded-back parts thereof.

4. An arrangement as set forth in claim 3, wherein the other bar has a longitudinal portion folded back on itself and clampingly receives the other intermediate portion between the folded-back parts thereof.

5. An arrangement as set forth in claim 4, wherein said carrier means and said bracket means include respective securing means securing the other longitudinal end portions of said bars to said shaft and to said guide wheel, respectively.

6. An arrangement as set forth in claim 4, wherein said moving means include a Bowden cable having a pressure member and a tension member respectively fastened to said bars.

7. An arrangement as set forth in claim 2, further comprising a guide wheel shaft mounted on said bracket means and having an axis, said guide wheel being mounted on said guide wheel shaft for rotation in a plane perpendicular to the axis of said guide wheel shaft, a cage pivotally mounted on said guide wheel shaft, a tensioning wheel mounted on said cage for rotation in said perpendicular plane, and yieldably resilient means biasing said cage to pivot on said guide wheel shaft in a predetermined direction.

8. An arrangement as set forth in claim 7, wherein said yieldably resilient means include a helical torsion spring coiled about said guide wheel shaft and having respective ends abuttingly engaging said cage and said bracket means.

* * * * *